United States Patent Office 3,759,818
Patented Sept. 18, 1973

3,759,818
PROCESS FOR THE PREPARATION OF SOLID UREA ADDUCTS
Jan Doelman and Hubrecht C. A. van Meurs, Amsterdam, Netherlands, assignors to Shell Oil Company, New York, N.Y.
No Drawing. Filed May 9, 1969, Ser. No. 823,485
Int. Cl. C07b 21/00
U.S. Cl. 208—25                    2 Claims

ABSTRACT OF THE DISCLOSURE

Avoiding agglomeration of urea adducts by dissolving the adductable organic compounds in a solvent containing a lower boiling adduct-forming compound and a compound that is polar or polarizable; and in a preferred operation; a compound that evaporates at adduct-forming temperatures to cool the mixture.

BACKGROUND OF THE INVENTION

The invention relates to a process for the preparation of solid adducts by adding one or more organic compounds capable of forming adducts (adductable organic compounds) onto urea in the presence of a solvent for urea and a solvent for the adductable organic compounds.

It is known that urea is capable of forming solid adducts with certain organic compounds. This formation of adducts is based on the principle that such organic compounds are capable of entering as guest molecules into a channel- or cage-like enclosure formed by urea molecules, without a chemical reaction being involved. Incorporated in these enclosures are only molecules of a very specific configuration, viz only those having a straight carbon chain of sufficient length. Examples of adductable compounds are straight chain hydrocarbons having at least five carbon atoms in each chain, and compounds derived from these hydrocarbons, such as alcohols, esters, ketones and acids having a straight carbon chain of sufficient length.

It is possible to prepare the adducts by starting from solid urea or from urea dissolved in a solvent. In the latter case the formation of the adducts is much more rapid than in the former. For this purpose many solvents are known, such as for example water, lower saturated monohydric and polyhydric alcohols, such as methanol, ethanol, ethylene glycol, and glycerol; amines such as mono-, di- and triethanol amine; ketones such as acetone, methyl ethyl ketone, methyl isobutyl ketone; nitriles such as acetonitrile; anhydrides such as acetic acid anhydride; as well as liquid sulphur dioxide, liquid carbon dioxide, liquid ammonia, etc.

In consequence of the fact that urea adducts form a voluminous mass during their preparation, the adductable compounds are as a rule also dissolved in a solvent. This solvent may or may not be the same as that for urea. Often use is made of a different solvent, viz one which is substantially immiscible with that for urea since this greatly facilitates the working-up of organic compounds which have not formed adducts and of any urea left after the preparation of adducts.

Well-known solvents for adductable organic compounds are chlorinated hydrocarbons such as chloroform, 1,2-dichloroethane, n-butyl chloride, carbon tetrachloride, trichloroethane and the chlorine/fluorine-substituted hydrocarbons with one or two carbon atoms per molecule. If chlorinated hydrocarbons are used a readily separable, coarse-grained adduct, is formed. Dichloroethane is a widely used solvent.

However, the use of chlorinated hydrocarbons as solvent for the adductable compounds presents a very specific problem. This problem arises from the fact that during the preparation of adducts water may be present. This water may have been used for example as solvent for the urea or may have been entrained with the adductable organic compounds. As is known, water readily reacts with a small quantity of chlorinated hydrocarbon, as a result of which hydrogen chloride may be formed which may cause corrosion of the reactor or of equipment connected therewith.

Another drawback of chlorinated hydrocarbons becomes apparent if adducts prepared are separated from their surrounding liquid and if this liquid is subsequently separated by means of distillation into organc compounds which are not adducted, and into chlorinated hydrocarbons. This distillation requires much heat.

The drawbacks stated in respect of chlorinated hydrocarbons in general do not apply to hydrocarbons. It is for this reason that as solvent for the adductable organic compounds hydrocarbons have been proposed which do not themselves form adducts with urea during the preparation of adducts. However, the use of hydrocarbons presents one difficulty in that in a reactor in which solid adducts are prepared agglomeration of adducts particles occurs even after a short time. This agglomeration may arise from the presence of solvent for urea since many of these solvents, for example water, are good binding agents for the adduct particles. This agglomeration makes it impossible to maintain a homogeneous suspension of the adduct particles in the reactor as a result of which the equipment becomes clogged. Whenever this happens the preparation of adduct would therefore have to be interrupted at short intervals in order to clean the equipment. Moreover, premature agglomeration of adduct particles formed causes organic compounds which it is desired to separate from the adductable organic compounds to be occluded in the agglomerates, which results in insufficient separation.

It has now been found that hydrocarbons can nevertheless be used as solvent for the adductable organic compounds if a mixture of these hydrocarbons with a polar or polarizable compound is employed.

The invention is characterized in that the solvent used for the adductable organic compounds is one of which at least one component, with or without the said adductable organic compounds, is likewise capable of forming solid adducts with urea under the conditions in which the preparation of adduct is carried out and of which at least one other component is a polar or polarizable compound.

Contrary to the results obtained when using only one of these components in the solvent, the use of a combination of the two components in the solvent has the effect of substantially completely suppressing the agglomeration of adduct particles. As a result the equipment no longer becomes clogged and the preparation of adduct need not repeatedly be interrupted. Moreover, a satisfactory separation between the organic compounds is effected.

The component which, with or without the adductable organic compounds, is likewise capable of forming solid adducts with urea is also referred to hereinafter as "co-adducting component." Thus, the co-adducting component is a component of the solvent for the adductable organic compounds and does not belong to the adductable organic compounds proper. In principle it is possible to select a co-adducting component from a large number of solvent components. However, since in general the adducts prepared are separated from the solvent and the solvent is subsequently recovered from the remaining liquid by means of distillation, it is advantageous to use a component with a relatively low boiling point. For this reason use is preferably made of an aliphatic hydrocarbon with a straight carbon chain having at least 5 and at most 10 carbon atoms per chain, as the component which is likewise capable of forming solid adducts with urea under the conditions in which the preparation of adducts is carried out.

Contrary to what is already known it is necessary according to the process of the invention to use a component in the solvent which at the temperature at which the preparation of adduct takes place is capable of forming adducts with urea. This temperature to be used should be so low as to permit the actual formation of the last-mentioned adducts. It was found that the highest temperature to be used lies even just above the decomposition temperature of the adduct of the co-adducting component. As used herein this decomposition temperature is understood to mean the highest temperature at which it is just possible for the adduct to exist in the absence of any solvent. Some of these decomposition tempeartures are stated for example in a publication by I. Orszag and J. Bathory "Dissociation of Urea Adducts" in Acta Chimica Hungaria 42 (1964), pages 119–129. A few examples are listed in the following table.

TABLE

| n-Alkane: | Decomposition temperature of the appurtenant adduct, °C. |
|---|---|
| Pentane | 0 |
| Hexane | 21 |
| Heptane | 42 |
| Nonane | 63 |
| Decane | 70 |

Thus the decomposition temeprature of the n-pentane adduct is 0° C., but the process according to the invention can still be carried out at 5° C. At 10° C., however, n-pentane no longer participates in the formation of adduct and agglomeration of the adducts of the adductable organic compounds occurs. N-Heptane in particular is highly sutiable, partly because its urea adduct decomposes into n-heptane and urea just above room temperature (see table above) so that the preparation of adduct can be carried out without it being necessary to cool to a temperature below room temperature, and partly because the boiling point of this n-alkane is still relatively low.

In order to reduce the risk of agglomeration of adducts still further, it is advantageous to prepare the adducts in the presence of the smallest possible amount of liquid which might act as binding agent in the event of agglomeration. For this reason use is made of the smallest possible amount of solvent for urea, which may be achieved by preparing a saturated solution of urea at the highest temperature possible, which in the case of water is 70°–80° C. and by carrying out the preparation of the solid adducts at the lowest temeprature possible. The effect of maintaining this low temperature is that the saturated solution forms a great amount of solid urea and that consequently the greatest possible amount of urea originating from the solvent takes part in the formation of adduct. At the same time the high solubility of urea at the temperature at which the urea solution was saturated causes only a small amount of this solvent and consequently a small amount of binding agent to be supplied to the reaction mixture. It is preferred therefore to prepare the solid adducts at a tempearture of at most 50° C. Temperatures between 10° C. and 20° C. have proved highly suitable. The minimum temperature at which it is still possible to prepare the solid adducts depends of course on the temperature at which the solvents themselves solidify.

The fact that a component of the solvent is capable of forming adducts does not necessarily imply that these adducts are actually present in the adducts prepared from the adductable organic compounds. It is for example possible to use such an amount of urea as is necessary for the preparation of the adducts from the adductable organic compounds.

According to the invention at least one other component of the solvent for the adductable organic compounds should be a polar or polarizable compound. In this context polarizable compounds are understood to mean those compounds which do not themselevs possess a dipole moment because of the symmetrical configuration of their molecules but in which molecules polar bonds are present (such as for example p-dichlorobenzene) or in which by reason of the attraction of the dipole of a polar compound a dipole moment can be generated by induction (such as for example in benzene or in p-dimethyl benzene). Suitable polar or polarizable compounds are aromatic compounds. As polar or polarizable compound use is preferably made of an aromatic hydrocarbon. Toluene has proved highly suitable for this purpose. Other suitable polar compounds are for example ketones, amides, furfural and amines.

The two components of the solvent for the adductable organic compounds can be used in any ratio desired. The component which is likewise capable of forming solid adducts with urea is preferably used in a quantity of at most 50% by volume, based on the solvent for the adductable organic compounds. The aggomeration is completely suppressed if the latter quantity is at least 20 and at most 50% by volume. A mixture of 60% by volume of toluene and 40% by volume of heptane was found highly suitable.

From the foregoing it is clear that the temperature at which the solid adducts are prepared is in general below the boiling point of co-adducting component. It is not sufficient therefore to maintain the temperature by evaporating solvent at atmospheric pressure. For this reason it is preferred to add to the solvent for the adductable organic compounds a volatile component which evaporates completely or partly at the temperature at which the solid adducts are prepared. In this case the heat generated during the preparation of adducts is absorbed by the heat required for the evaporation of this volatile component so that the temperature at which the preparation of adducts takes place hardly needs to be changed. Suitable volatile components of the solvent for the adductable organic compounds are n- and/or iso-butane because of their low boiling points. Other volatile compounds such as propane can of course be used as well.

The concentration of the adductable organic compounds in an appropriate solvent can vary within wide limits. A rising concentration will of course also raise the quantity of adducts formed per unit of volume of solvent. The concentration to be used in a particular case mainly depends on the nature of the adductable organic compounds and on the viscosity of the liquid containing the adducts prepared. In general favorable results are obtained if the solvent for the adductable organic compounds contains these compounds in a concentration of at most 10% by weight and preferably of at most 5% by weight.

The process according to the invention can be carried out with any quantity of urea desired per quantity of adductable organic compounds. It is possible to use the quantity of urea stoichiometrically required for the adduction of these compounds but a greater or a smaller quantity may likewise be used.

The solid adducts prepared by means of the process according to the invention can be subjected to further processing in any manner desired. It is possible, for example, to separate the adducts formed from the liquid containing them, for example by filtering, by centrifuging or by means of a hydrocyclone. Alternatively, the adduct particles formed may also be worked up into larger particles in a pelletizing apparatus and the pellets formed herein may be separated by means of a simple separator such as a sieve. The separated or pelletized solid adducts may subsequently be worked up into adductable organic compounds and urea, for example by heating or by treatment with a solvent. The liquid remaining after the separation of the solid adducts can likewise be subjected to further processing in any manner desired. Thus, as and when appropriate, non-adductable organic compounds may be worked up from this liquid. Based on this principle is a process for the separation of a mixture of organic compounds one part of which is adductable and another part of which is not adductable. Separations of this type are widely used in the petroleum industry and solid adducts are therefore preferably prepared by starting from a mixture containing hydrocarbons with a branched carbon chain and hydocarbons with an at least substantially straight carbon chain. Examples of such mixtures are paraffinic crude oils and hydrocarbon mixtures obtained by distillation of a crude oil or of crude oil fractions, such as for example gasolines, kerosines, gas oils, lubricating oils and higher boiling fractions. Hydrocarbon mixtures obtained by means of a cracking process, whether or not carried out in the presence of hydrogen, can likewise be used, for example a heavy distillate obtained after distillation of products resulting from catalytic cracking of a crude oil fraction. Another example is a raffinate obtained by treating a heavy distillate of this type with a solvent for aromatic compounds, for example with furfural.

The process according to the invention is hghly suitable for the production of gasoline with a high octane number and of kerosines, gas oils and lubricating oils with a low pour point.

The invention will further be elucidated with reference to the following examples. The starting material used for the purpose of these examples was a hydrocarbon oil obtained by distilling a paraffinic crude oil at a pressure lower than 1 atm. abs. The hydrocarbon oil had a boiling range of from 350° to 480° C. and contained 43% by weight of adductable paraffins. The oil was dissolved in a solvent and was passed into the first of two reactors arranged in series. The contents of each reactor were stirred by means of a propeller mixer. The residence time of the material in the reactors was 14 minutes per reactor.

A saturated aqueous urea solution was prepared at 70° C. or 80° C. whereupon the saturated solution was likewise introduced into the first reactor. Per litre of oil, 1.9 litres of this urea solution was used, except in the Experiments 10 and 11 described in Example III. Unless otherwise stated the conditions prevailing during the experiments described in the examples were identical.

Example 1

The solvent consisted of 60% by volume of toluene and 40% by weight of n-heptane and contained 4% by weight of the starting material. The urea solution had been prepared as a saturated solution at 80° C. Four experiments were carried out each at a different temperature. These temperatures were all lower than the decomposition temperature of n-heptane adduct. Table A shows the duration of each of four experiments and the appurtenant conversion (the percentage by weight of the adductable compounds which had been adducted after passage through the second reactor).

TABLE A

| Experiment number | Reactor temperature, °C. | Conversion, percent by weight | Duration of experiment, hours |
|---|---|---|---|
| 1 | 5 | 92.5 | 29 |
| 2 | 10 | 89 | 10 |
| 3 | 15 | 89 | 20 |
| 4 | 20 | 89.5 | 17 |

For the duration of each of the four experiments the adducts present in the reactor did not show any tendency to agglomerate.

Example II

In the four experiments described in this example the saturated urea solution had been prepared at 70° C. The remaining conditions were as described in Example I. Table B shows the duration of each of the experiments and the appurtenant conversion.

TABLE B

| Experiment number | Reactor temperature, °C. | Conversion, percent by weight | Duration of experiment, hours |
|---|---|---|---|
| 5 | 5 | 85.5 | 19 |
| 6 | 10 | 91.5 | 16 |
| 7 | 15 | 91 | 16 |
| 8 | 20 | 87.5 | 11 |

Although the urea solution had been prepared at a lower temperature than was the case in the experiments of Example I, so that more water was present in the reactors, yet the adducts present in the reactors were found to show no tendency to agglomerate during any of the four experiments.

Example III

In this example use was made of three different volumes of saturated urea solution per unit of volume of oil. In the following Table C these volumes are indicated with $R_f$. The temperature in the reactors was 15° C., the solvent used and the saturation temperature of the urea solution were the same as described in Example II.

TABLE C

| Experiment number | $R_f$ v./v. | Conversion, percent by weight | Duration of experiment, hours |
|---|---|---|---|
| 9 | 1.9 | 92.5 | 9 |
| 10 | 2.1 | 94 | 12 |
| 11 | 2.3 | 94.5 | 12 |

Also, in this case the adducts present in the reactors did not show any tendency to agglomerate during any of the three experiments.

Example IV

In this example use was made of various concentrations of the oil in the solvent. The temperature in the reactors was 15° C., the remaining conditions being identical to those described in Example II. The following Table D shows the duration of each of the experiments and the appurtenant conversion.

TABLE D

| Experiment number | Oil concentration, percent by weight | Conversion, percent by weight | Duration of experiment, hours | Agglomeration |
|---|---|---|---|---|
| 12 | 4 | 91 | 16 | No. |
| 13 | 15 | 92 | 9 | No. |

In Experiments 12 and 13 no agglomeration of adducts present in the reactors was observed after 16 and 9 hours respectively.

Example V

The conditions under which the five experiments described in this example were carried out corresponded to those described in Example II, except that in each experiment a different solvent was used. The following Table E shows the duration of each of the five experiments and the appurtenant conversion.

TABLE E

| Experiment number | Reactor temperature, °C. | Composition of oil solvent | Conversion, percent by weight | Duration of experiment, hours | Agglomeration |
|---|---|---|---|---|---|
| 14 | 5 | Toluene | 85.5 | 4 | Yes. |
| 15 | 15 | 80% by volume of toluene plus 20% by volume of n-heptane | 90.5 | 13 | No. |
| 16 | 15 | 60% by volume of toluene plus 40% by volume of n-heptane | 91 | 16 | No. |
| 17 | 15 | 40% by volume of toluene plus 60% by volume of n-heptane | 81.5 | 9 | Yes. |
| 18 | 5 | n-Heptane | 70 | 2 | Yes. |

From the data in Table E it is clear that the use of toluene or n-heptane as solvent very soon causes the adducts to agglomerate. The agglomeration is delayed for a longer time if a solvent is used which contains 40% by volume of toluene and was not observed if use was made of a solvent which contains 60% by volume of toluene and 40% by volume of n-heptane or 80% by volume of toluene and 20% by volume of n-heptane.

Example VI

The conditions under which the five experiments described in this example were carried out corresponded to those described in Example II except that in each experiment a different solvent was used and that the reaction temperatures and the temperatures at which the urea solution was saturated were as listed in the following Table F.

TABLE F

| Experiment number | Reactor temperature, °C. | Saturation temperature of the urea solution | Composition of oil solvent | Conversion, percent by weight | Duration of experiment, hours | Agglomeration |
|---|---|---|---|---|---|---|
| 19 | 20 | 70 | Toluene | 87.5 | 5 | Yes. |
| 20 | 20 | 70 | 80% by volume of toluene plus 20% by volume of n-heptane | 90.5 | 10 | No. |
| 21 | 2.0 | 70 | 60% by volume of toluene plus 40% by volume of n-heptane | 87.8 | 11 | No. |
| 22 | 15 | 80 | 40% by volume of toluene plus 60% by volume of n-heptane | 89.5 | 10 | Yes. |
| 23 | 5 | 70 | n-Heptane | 70 | 2 | Yes. |

From the data in Table F it is clear that also in this case the use of toluene or n-heptane as solvent very soon causes the adducts to agglomerate. As is the case with Experiment 17 in Example V the agglomeration is delayed for a longer time if a solvent is used which contains 40% by volume of toluene and it does not occur at all if a solvent is used which contains 60% by volume of toluene and 40% by volume of n-heptane or 80% by volume of toluene and 20% by volume of n-heptane.

Example VII

In this example the results are shown of four experiments which were carried out with a mixture of 60% by volume of toluene and 40% by volume of pentane as solvent. The $R_f$ and the oil concentration were the same as those in the experiments described in Example II. Some data of the experiments are shown in the following Table G.

TABLE G

| Experiment number | Reactor temperature, °C. | Saturation temperature of the urea solution, °C. | Conversion, by weight percent | Duration of experiment, hours | Agglomeration |
|---|---|---|---|---|---|
| 24 | 5 | 70 | 91 | 16 | No. |
| 25 | 10 | 70 | 91 | 7 | Yes. |
| 26 | 10 | 80 | 91 | 12 | Yes. |
| 27 | 15 | 80 | 96.5 | 9 | Yes. |

From the data in Table G it is clear that only then does the use of the said pentane toluene mixture not result in agglomeration if the temperature is at most 5° C. above 0° C. (the temperature at which pentane urea adduct can remain in existence).

Example VIII

This example demonstrates that the use of toluene as solvent very rapidly causes agglomeration. Some data concerning three experiments are shown in the following Table H; the $R_f$ and the oil concentration were as mentioned in Example II.

TABLE H

| Experiment number | Temperature, °C. | Saturation temperature of the urea solution, °C. | Conversion, percent by weight | Duration of experiment, hours | Agglomeration |
|---|---|---|---|---|---|
| 14 | 5 | 70 | 85.5 | 4 | Yes. |
| 28 | 10 | 80 | 91.5 | 7 | Yes. |
| 19 | 20 | 70 | 87.5 | 5 | Yes. |

Example IX

The conditions under which the four experiments described in this example were carried out corresponded to those described in Example II except as otherwise stated in the following Table I.

TABLE I

| Experiment number | Reactor temperature, °C. | Composition of oil solvent | Conversion, percent by weight | Duration of experiment, hours | Agglomeration |
|---|---|---|---|---|---|
| 29 | 2 | n-Pentene | 82 | 2 | Yes. |
| 30 | 5 | Cyclohexane | 74 | 2 | Yes. |
| 31 | 5 | 70% by volume of cyclohexane plus 30% by volume of n-heptane. | 83 | 4 | Yes. |

Experiment 29 shows that the use of n-pentane very soon results in agglomeration. Although this compound is capable of forming adducts at 2° C. there is no polar or polarizable compound present.

Experiment 30 shows that cyclohexane (which is neither a polar or polarizable compound nor an adductable compound) very rapidly causes agglomertion. According to Experiment 31 the presence of the adductable n-heptane in addition to cyclohexane in the solvent does not result in any improvement.

We claim as our invention:

1. A process for the preparation of solid urea adducts of straight chain hydrocarbons which comprises contacting a hydrocarbon mixture containing straight chain hydrocarbons with urea in the presence of water and a solvent for straight chain hydrocarbons, said solvent for straight chain hydrocarbons consisting essentially of a mixture of (1) toluene with (2) from 20 to 50% by volume based on the solvent mixture of heptane, said contacting step being effected at a temperature such that the aliphatic hydrocarbon component of the solvent mixture forms adducts with urea.

2. The process of claim 1 wherein the concentration of straight chain hyrocarbons obtained from the hydrocarbon mixture is at the most 10% by weight based on the solvent for straight chain hydrocarbons.

References Cited

UNITED STATES PATENTS 3,163,632 12/1964 Leas et al. _____ 260—96.5 R
3,506,569 4/1970 Yata et al. _____ 260—96.5 U

OTHER REFERENCES 1,225,328 9/1966 Germany _____ 260—96.5 U

LEON ZITVER, Primary Examiner

M. W. GLYNN, Assistant Examiner

U.S. Cl. X.R.

260—96.5 C; 208—308